United States Patent

Stanley

[15] 3,673,435

[45] June 27, 1972

[54] ELECTRONIC RELAY

[72] Inventor: Brian Stanley, Infinity, Knowle Gardens, Combe Martin, Devon, England

[22] Filed: March 17, 1970

[21] Appl. No.: 20,240

[30] Foreign Application Priority Data

March 18, 1969 Great Britain......................14,189/69

[52] U.S. Cl.................................307/257, 307/321, 328/97, 328/101, 328/105, 328/153, 331/113 A, 331/172

[51] Int. Cl........................................................H03k 17/74

[58] Field of Search..................307/257, 321, 236, 270, 244; 328/101, 97, 208, 153, 105; 331/172, 113 A; 315/209 T

[56] References Cited

UNITED STATES PATENTS

| | | | |
|---|---|---|---|
| 3,379,898 | 4/1968 | Adler et al. | 328/105 X |
| 2,892,103 | 6/1959 | Scarbrough | 328/101 X |
| 3,100,286 | 8/1963 | Jones | 328/208 X |
| 2,976,461 | 3/1961 | Dilger et al. | 315/209 T |

FOREIGN PATENTS OR APPLICATIONS

| | | | |
|---|---|---|---|
| 220,065 | 1/1958 | Australia | 307/257 |

*Primary Examiner*—Stanley T. Krawczewicz
*Attorney*—Irving M. Weiner

[57] ABSTRACT

An electronic relay having two push-pull oscillators connected in series. Each oscillator has two transistors and a transformer having, in addition to its input and feedback windings, a control winding. Each oscillator is controlled by a latch circuit which can prevent oscillation by connecting a low resistor across the control winding. The latch circuits are interconnected so that only one oscillator can oscillate at any time.

10 Claims, 4 Drawing Figures

INVENTOR
BRIAN STANLEY
BY Irving M. Weiner
ATTORNEY

INVENTOR
BY BRIAN STANLEY.
ATTORNEY

INVENTOR
BY BRIAN STANLEY
ATTORNEY

ELECTRONIC RELAY

This invention relates to an electronic relay which is suitable for use in communication systems.

In communication systems such as telegraph and data transmission systems direct current signals of double or single current polarities are utilized to transmit information from one location to another location. Adjacent systems, for example, systems in adjacent countries often utilize different signalling potentials necessitating a means for converting signals from one set of potentials to another set of potentials at the interface between the two systems.

When converting a signal at one potential to a signal of another potential it is necessary to maintain isolation between the two systems. Hitherto an electromechanical device known as a polarized telegraph relay has been utilized to perform the conversion and this device does provide the required amount of isolation. However, signalling speeds have recently been increased by a factor of up to 100 and under such conditions a polarized telegraph relay does not provide satisfactory service in that it requires relatively frequent attention.

It is an object of this invention to provide an electronic relay which can perform the function of converting a signal at one potential to a signal at another potential.

According to this invention there is provided an electronic relay comprising an oscillator including a transistor and a transformer having, in addition to its input and feedback windings, a control winding, and switching means operative in response to a control signal to connect a low resistance across the control winding.

Preferably the oscillator is of the push-pull type and includes two transistors.

In use, the oscillator may be utilized to convert a signal, which is in a first communication system and is at a first potential, into a signal which is in a second communication system and is at a second potential. In this case the oscillator is energized at the second potential and will oscillate provided the said low resistance is not connected across the control winding. Assuming that the oscillations of the oscillator are of a square wave form the oscillator which will draw a direct current, which varies little, will act as a low resistance in series with the second potential, and therefor simulates a mechanical relay, the contacts of which are closed. If the said low resistance is connected across the control winding the oscillator will not oscillate and acts as an open circuit so that it simulates a mechanical relay the contacts of which are open. The signal at the first potential is utilized to control the said switching means.

The electronic relay in accordance with this invention when utilized in the manner described in the previous paragraph provides isolation between the two communication systems because the signal at the first potential is only applied to the control winding which is electrically isolated from the rest of the oscillator.

According to a feature of this invention there is provided an electronic relay comprising first and second electronic relays as have been set forth connected in series.

In use, the junction of the first and second electronic relays will normally be connected to an output load and the remote ends of the first and second electronic relays will be connected to positive and negative potentials respectively.

If the switching means of the first electronic relay has been operated to connect the associated low resistance across the control winding of the first electronic relay while the switching means of the second electronic relay has not been operated to connect the associated low resistance across the control winding of that second electronic relay, then the second electronic relay alone will oscillate connecting the output terminal to the negative potential. Similarly if the control winding of the second electronic relay has the associated low resistance connected across it while the control winding of the first electronic relay does not have the associated low resistance connected across it, then only the oscillator of the first electronic relay will oscillate connecting the output terminal to the positive potential.

Preferably the electronic relay comprises first and second latch circuits which incorporate the switching means of the first and second electronic relays respectively, the first and second latch circuits being interconnected so that only one of the oscillators can oscillate at any time.

Preferably the first and second latch circuits are connectable so that, in use, if the input signal is entirely removed the oscillator which was oscillating at the instant of the removal of the input signal continues to oscillate.

Preferably the first and second latch circuits are connectable so that, in use, in the absence of an input signal a particular oscillator oscillates.

Electronic relays in accordance with this invention will now be described, by way of example only, with reference to the accompanying drawings of which:

Figure 1:
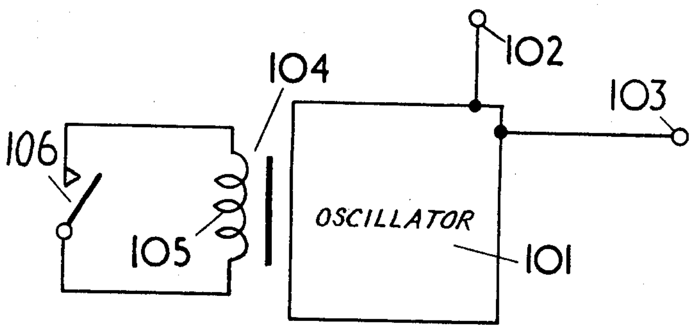
FIG. 1 is a circuit diagram of an electronic relay in accordance with this invention which has a single current (neutral) input and output.

Referring to FIG. 1 the electronic relay shown therein has an oscillator 101 connected between a supply terminal 102 and an output terminal 103. The oscillator 101 is a push-pull oscillator having two transistors and a transformer 104 having input and feedback windings. The transformer also has a control winding 105 across which a switch 106 is connected. When the switch 106 is open the oscillator oscillates with a square wave form and acts as a low resistance between the supply and output terminals 102 and 103 so that the output terminal 103 is at the supply potential. When the switch 106 is closed a very low resistance is connected across the winding 105 preventing oscillation so that the output terminal 103 is not connected to the supply terminal 102.

In the arrangement shown in FIG. 1 the switch 106 is an electronic switch and it is to be noted that the signal arranged to control this electronic switch is entirely electrically isolated from the output terminal 103.

Figure 2:
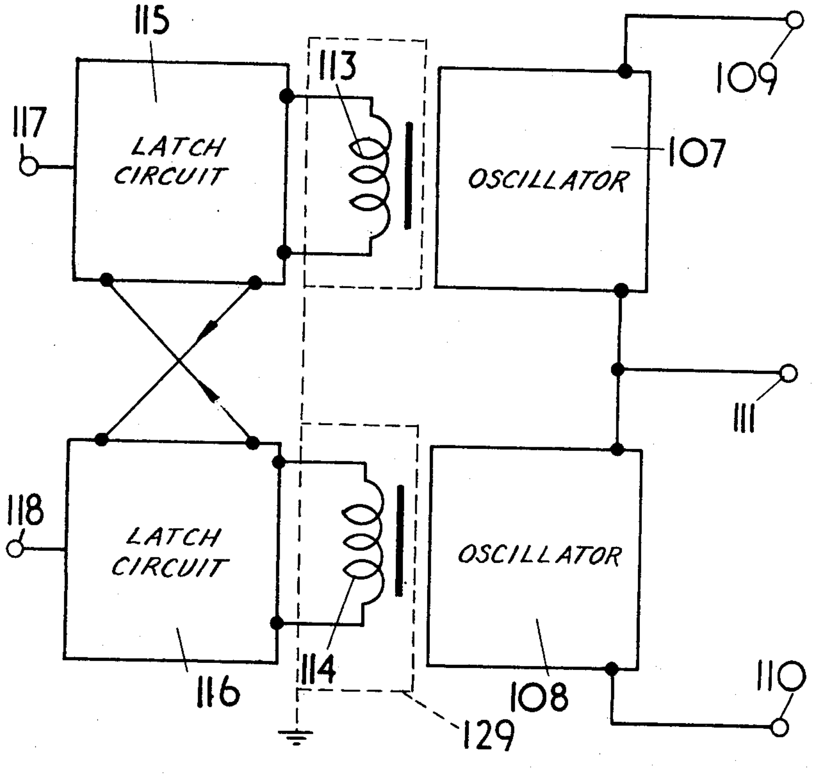
FIG. 2 is a block diagram of a further electronic relay in accordance with this invention connected to provide a double current (polar current) input and output.

The electronic relay shown in FIG. 2 has two oscillators 107 and 108 similar to the oscillator 101 shown in FIG. 1, the oscillators 107 and 108 being connected in series between positive and negative supply terminals 109, 110. An output terminal 111 is connected to the junction of the two oscillators 107 and 108. The oscillators 107 and 108 are provided with control windings 113 and 114 respectively connected to latch circuits 115 and 116 respectively. The windings of the transformers are screened as indicated at 129. The latch circuits 115 and 116 are interconnected, the arrangement being that at any time a low resistance is connected across one of the control windings 113 and 114 whereas the other control winding is open circuited. As a result at any one time one of the oscillators 107 and 108 is oscillating whereas the other is not. If the oscillator 107 is oscillating the output terminal 111 is connected to the positive supply terminal 109 whereas if the oscillator 108 is oscillating the output terminal 111 is connected to the negative supply terminal 110. The latch circuits 115 and 116 have input terminals 117 and 118 across which a telegraph signal is intended to be connected. As in the arrangement shown in FIG. 1 the input terminals 117 and 118 are electrically isolated from the output terminal 111 and from the supply terminal 109 and 110.

Figure 3A:
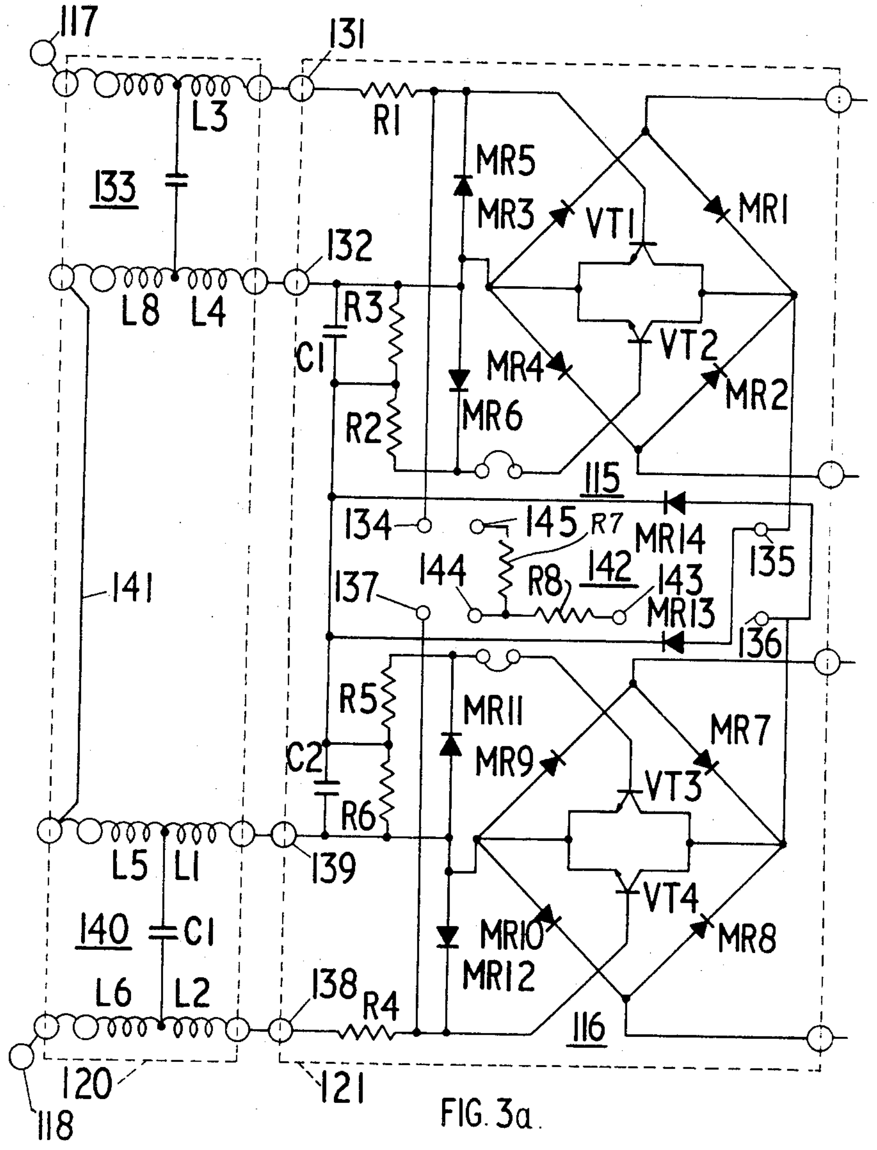
FIGS. 3*a* and 3*b* are together a circuit diagram of the electronic relay shown in FIG. 2.
Figure 3B:
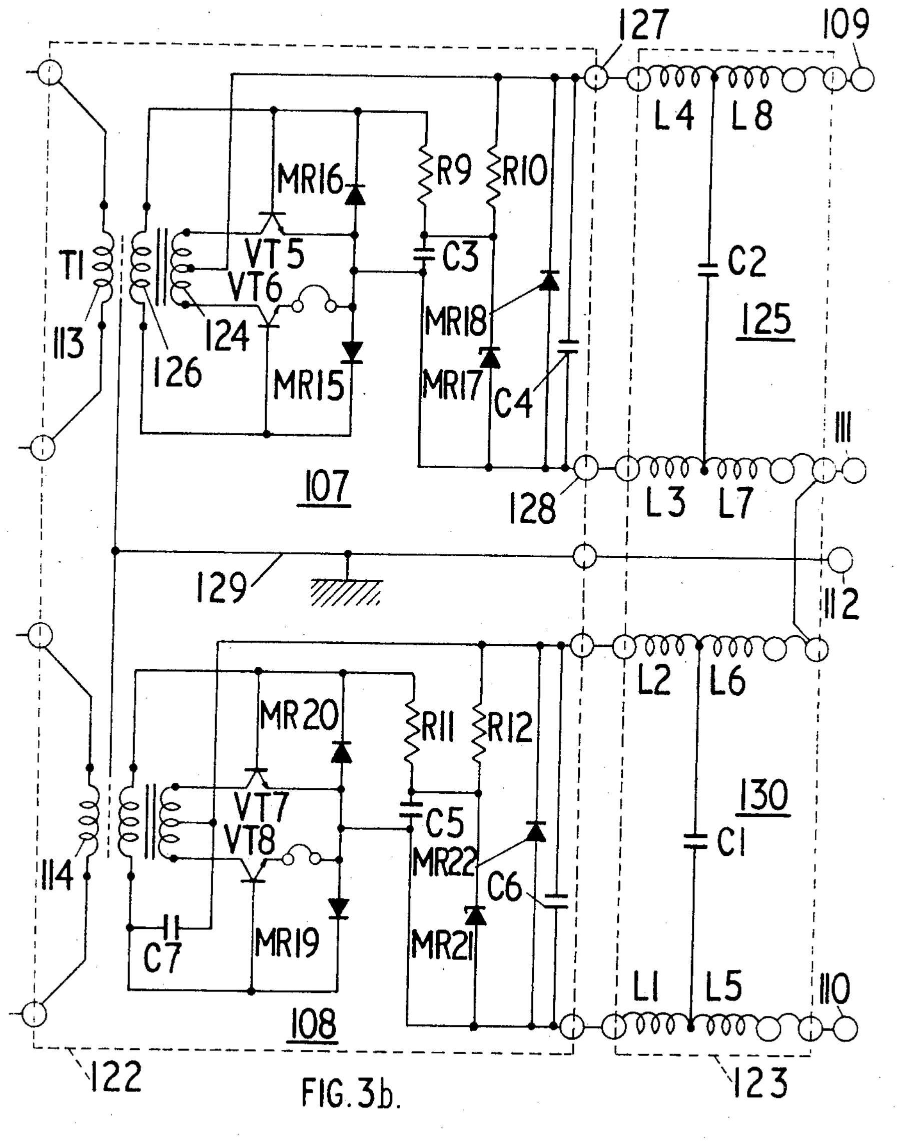

FIGS. 3*a* and 3*b* are together a circuit diagram of the arrangement shown in FIG. 2 and this relay has four printed circuit boards 120, 121, 122, 123 on which the various components of the relay are mounted. The terminals of each circuit board are numbered and are denoted by small circles. The input terminals, the supply terminals and the output terminals are all mounted outside the printed circuit boards and are numbered and are designated by slightly larger circles.

The printed circuit board 120 only carries input filters, the board 121 carries the latch circuits 115 and 116 which may be interconnected in various ways, the board 122 carries the oscillators 107 and 108 and the board 123 carries output filters.

The oscillators 107 and 108 are identical and the oscillator 107 comprises two transistors VT5 and VT6, the collectors of which are connected to opposite ends of a center tapped input winding 124 of a transformer which is denoted by reference T1. The center tap of the winding 124 is connected to a positive supply terminal 127 connected through an output filter 125 to the positive supply terminal 109. The bases of the transistors VT5 and VT6 are connected to opposite ends of the feedback winding 126 of the transformer T1 and are also connected to their respective emitters through diodes MR16 and MR15 respectively poled in the opposite direction to the base emitter junctions of those transistors. The emitters of the transistors VT5 and VT6 are connected together and to the negative supply terminal 128 for the oscillator 107, this negative supply terminal 128 being connected to the output terminal 111 through the filter 125.

A capacitor C4 and a reverse poled diode MR18 are connected in parallel between the terminals 127 and 128 and a resistor R10 and a Zener diode MR17 are also connected in series between the terminals 127 and 128. The junction of the resistor R10 and the Zener diode MR17 is connected to the emitters of the transistors VT5 and VT6 through the capacitor C3 and to the base of the transistor VT5 through resistor R9. The control winding 113 of the oscillator 107 has already been referred to and is also shown in FIG. 3; the core of the transformer T1 is grounded over line 129.

The oscillator 107, assuming the control winding 113 is open circuited, oscillates in conventional manner and produces a square wave output. As at any time one of the transistors VT5 and VT6 is conducting when the oscillator 107 is oscillating, the oscillator 107 acts as a low resistance connected between the terminals 127 and 128 under these circumstances. The circuit comprising the resistor R10, the Zener diode MR17 and the resistor R9 serves to stabilize the collector currents so that when oscillation is inhibited by the winding 113 being short circuited the collector current is not excessive at the maximum value of the supply voltage. Furthermore this circuit will permit the oscillator 107 to start to oscillate at the lowest permissible value of the supply voltage when the control winding 113 is open circuited.

The diode MR18 protects the oscillator 107 from being damaged when a reverse polarity supply is connected to the oscillator 107 and also reduces the effect of line transients.

The filter circuit 125 is a conventional H-section low-pass filter and serves to ensure that when the oscillator 107 is conducting it acts solely as a low resistance so that the current it draws is purely DC.

The oscillator 108 is identical to the oscillator 107, being connected between the output terminal 111 and the negative supply terminal 110 through a filter circuit 130 identical to the filter circuit 125.

The two latch circuits 115 and 116 are, as already explained, interconnected and have the function of ensuring that only one of the oscillators 107 and 108 is oscillating at any one time. The latch circuit 115 is identical to the circuit 116 and comprises a rectifier bridge made up of diodes MR1, MR2, MR3, and MR4, control winding 113 being connected across one diagonal of this rectifier bridge. Two transistors VT1 and VT2 are connected across the other diagonal of this rectifier bridge so that if either of the transistors VT1 or VT2 is caused to conduct the control winding 113 is effectively short circuited. The latch circuit 115 has two input terminals 131 and 132 the terminal 131 being connected to the main input terminal 117 through a low pass filter 133.

The terminal 131 is connected to the base of the transistor VT1 through a resistor R1 and is also connected through the resistor R1 to a terminal 134, the function of which will be described later. The junction of the diodes MR3 and MR4 to which the emitters of the transistors VT1 and VT2 are connected, is also connected directly to the terminal 132, to the base of the transistor VT1 through a diode MR5 and to the base of the transistor VT2 through a diode MR6. The positive output of the bridge rectifier is applied to a terminal 135 which is also connected to the latch circuit 116. The corresponding positive output of the bridge rectifier of the latch circuit 116 is applied to a terminal 136 which is connected to the junction of two resistors R2 and R3 connected in series between the terminal 132 and the base of the transistor VT2. The resistor R3 is shunted by a capacitor C1.

As already stated, the latch circuit 116 is identical to the latch circuit 115 and the terminal corresponding to the terminal 134 is denoted at 137. The two input terminals of the latch circuit 116 are denoted at 138 and 139, terminal 138 being connected to the terminal 118 through a low-pass filter 140 corresponding to the low-pass filter 133. The filters 133 and 140 are interconnected by a line 141 and the terminals 132 and 139 are interconnected through the filter 133, the line 141 and the filter 140.

A circuit 142 is provided and this circuit can be connected to the terminals 134, 135, 136 and 137 in a manner which will be described. The circuit 142 comprises a resistor R8 connected between terminals 143 and 144 and a further resistor R7 connected between the terminal 144 and further terminal 145.

It will be initially assumed that the circuit 142 is in no way connected to the latch circuits 115 and 116. Under these circumstances one of the oscillators 107 and 108 is oscillating and assuming the oscillator 107 is oscillating an alternating potential will appear across the control winding 113. This alternating potential is rectified by the rectifier bridge of the latch circuit 115 and is applied through the diode MR13 and the resistor R5 as a positive potential to the base of transistor VT3. This positive potential to the base of the transistor VT3 causes transistor VT3 to conduct so that the control winding 114 of the oscillator 108 is effectively short circuited through the rectifier bridge made up of components MR7, MR8, MR9 and MR10 and prevents oscillator 108 from oscillating.

This condition will remain until appropriate signal, which may be a telegraph signal, is applied to the terminals 117 and 118. If an input signal is applied which makes the terminal 117 positive with respect to the terminal 118, then signal applied to the terminal 117 will be applied through the resistor R1 to the base of the transistor VT1 and will cause it to conduct. Consequently, a very low impedance will be connected through the bridge made up of the diodes MR1, MR2, MR3 and MR4 across the control winding 113 and this will prevent the oscillator 107 from continuing to oscillate. As a result, the output of the rectifier bridge of the latch circuit 115 falls to zero and the transistor VT3 ceases to conduct. The control winding 114 is then open circuited and the oscillator 108 begins to oscillate.

As soon as the oscillator 107 ceases to conduct and the oscillator 108 begins to oscillate the output terminal 111 is connected to the negative supply terminal 110 instead of to the positive supply terminal 109.

When oscillator 108 is oscillating the alternating potential appearing across its control winding 114 is rectified by the rectifier bridge of the latch circuit 116 and is a positive potential which is applied through the diode MR14 and resistors R2 to the base of the transistor VT2 causing it to conduct. This further reduces the impedance connected across the control winding 113 maintaining the condition in which the oscillator 107 is not oscillating and the oscillator 108 is oscillating.

The effect of the resistor R3 and the capacitor C1 of the latch circuit 115 is that when the rectifier bridge of the latch circuit 116 ceases to produce a positive output potential the transistor VT2 is not immediately cut off so that the oscillator 107 does not immediately begin to oscillate. The capacitor C2 and the resistor R6 of the latch circuit 116 perform a similar function in that latch circuit.

The diodes MR5, MR6, MR11, MR12, MR15, MR16, MR19, and MR20 of the latch circuits 115, 116 and the oscillators 107 and 108 have the function of preventing reverse bias being applied to the transistors VT1, VT2, VT3, VT4, VT6, VT5, VT8, and VT7 respectively.

The relay which has been described with reference to FIGS. 2 and 3 has been described as one having a double current (polar) input with a double current (polar) output. However, it can be connected to provide single current (neutral) input with a double current (polar) output. For this purpose terminal 135 is connected to terminal 143 and terminal 144 is connected to terminal 134.

In this arrangement when no input signal at all is applied to terminals 117 and 118, oscillator 107 cannot oscillate but should it oscillate the rectified output voltage of the signal across the winding 113 will appear as a positive voltage at the terminal 135 and will be applied through the resistor R8 to the base of the transistor VT1 causing it to conduct. In this way the oscillator 107 is prevented from conducting in the absence of an input signal in which circumstances the oscillator 108 conducts. As in the previous arrangement when oscillator 108 conducts, transistor VT2 is caused to conduct thus further ensuring that oscillator 107 will not conduct.

Thus the relay is sidestable with a negative potential being applied to the output terminal 111.

When an input signal is applied to the terminals 117 and 118 such that the terminal 118 is a positive potential with respect to the terminal 117, the positive potential on the terminal 118 is applied through the resistor R4 to the base of the transistor VT4 causing it to conduct. In this way the winding 114 is short circuited preventing the oscillator 108 from oscillating. At the same time the negative potential at the terminal 117 is applied through the resistor R1 to the base of the transistor VT1 and overrides any positive potential applied to that transistor through the resistor R8. Consequently, the transistor VT1 ceases to conduct and the control winding 113 is open circuited permitting the oscillator 107 to oscillate so that a positive potential is applied to the output terminal 111. It should be noted that the positive potential previously applied to the base of the transistor VT2 is removed because the oscillator 108 has ceased to oscillate.

The oscillator 108 under these circumstances is prevented from oscillating by the input signal applied through the resistor R4 and also by the output potential of the rectifier bridge of the latch circuit 115 which is applied through the diode MR13 and the resistor R5 to the base of the transistor VT3.

If it is desired to achieve a faster switching action, terminal 145 is connected to terminal 137 so that there is a direct link between the base of the transistor VT4 and the base of the transistor VT1. This direct link does of course pass through the terminals 134 and 144 which are connected as previously.

In the single current (neutral) input and double current (polar) output which has just been described a negative potential is applied to the output terminal 111 in the absence of any input signal. Should it be required that in the absence of any input signal a positive potential is applied to the output terminal, then the terminal 136 is connected to the terminal 143, the terminal 144 is connected to the terminal 137 and the terminal 145 is connected to the terminal 134.

Resistor R7 is still connected directly between the bases of the transistors VT1 and VT4 but the effect of the connection of the resistor R8 is to prevent the oscillator 108 from oscillating in the absence of any input signal so that the oscillator 107 oscillates.

The input signal required to cause the oscillator 108 to oscillate and the oscillator 107 to cease to oscillate is that the terminal 117 should be the positive potential with respect to the terminal 118.

Should it be required to provide a single current (neutral) input and output, the oscillator 108 alone is used. To prevent the oscillator 107 oscillating the terminal 127 is not connected to the filter 125 so that under no circumstances will it oscillate, as it is not provided with a power supply.

As oscillator 107 is not in use, there is no latching effect at all. The terminal 136 is connected to the terminal 143 and the terminal 144 is connected to the terminal 137 so that in the absence of any input signal the oscillator 108 cuts itself off and prevents itself from oscillating by the output of the rectifier bridge applied to the resistor R8 to the base of the transistor VT4. Under these circumstances, there is no potential at all applied to the output terminal 111.

In order to cause a negative potential to be applied to the output terminal 117 must be positive with respect to the terminal 118. The negative potential on the terminal 118 cuts off the transistor VT4 so that the oscillator 108 can conduct. The terminals 134 and 145 should be interconnected so that resistor R7 interconnects the bases of the transistors VT1 and VT4 to provide rapid switching.

In the single current (neutral) input and output relay described in the previous paragraph only a negative potential can be applied to output terminal 111.

In order to provide a single current (neutral) input and output relay in which a positive potential is applied to the output terminal 111, terminal 135 is connected to terminal 143, terminal 145 is connected to terminal 137 and terminal 144 is connected to terminal 134. Furthermore, the terminal 127 is connected to the filter 125 but the corresponding terminal of the oscillator 108 is not connected to the filter 130.

The signal which will cause the oscillator 107 to oscillate so that a positive signal is applied to the output terminal 111 is that in which the terminal 117 is negative with respect to the terminal 118.

In order to provide double current input and single current output, the terminals 135, 136, 143, 145, 144, 134 and 137 are not interconnected and either terminal 109 or terminal 110 is connected to the supply in dependence upon which output polarity is required.

The pins 135, 136, 143, 145, 144, 134 and 137 can all be interconnected by links (not shown).

The embodiment illustrated has the advantage that the oscillators will operate over a wide range of operating limits, e.g., a supply voltage from 3–0–3 to 120–0–120 volts (0–3 to 0–120 volts single current output).

The oscillators 107 and 108 can be switched at high speeds, e.g., up to 5,000 bands.

The input circuits will operate over a wide range of input signals, e.g., signals above 0.5–0–0.5 volts.

The illustrated relay can be used as an interface and a level converter under any signalling condition.

In one modification the filters 133, 140, 125 and 130 are omitted.

In another modification the oscillators 107 and 108 are not of the push-pull type and only have one transistor. Each oscillator is arranged to conduct for most of each cycle and, when oscillating, effectively draws d.c. from the supply because of the provision of the associated output filter.

I claim:

1. An electronic relay comprising first and second power supply terminals, an oscillator connected across said power supply terminals and including a first transistor and a transformer having an input winding, a feedback winding, and a control winding, said transistor being connected to said input and feedback windings, a low value resistance, and switching means operative in response to an electrical control signal to connect the low value resistance across the control winding to inhibit said oscillator which acts as a switch between said power supply terminals.

2. An electronic relay as claimed in claim 1 wherein the oscillator is of the push-pull type and includes a second transistor, the collectors of which are connected to respective ends of said input winding, the bases of which are connected to respective ends of said feedback winding, and the emitters of which are connected to said second power supply terminal, and said input winding being tapped with its tapping connected to said first power supply terminal.

3. An electronic relay comprising first and second electronic relays as claimed in claim 1 connected in series.

4. An electronic relay as claimed in claim 3 which comprises first and second latch circuits which incorporate the switching means of the first and second electronic relays respectively, the first and second latch circuits being interconnected so that only one of the oscillators can oscillate at any time.

5. An electronic relay as claimed in claim 4 wherein the first and second latch circuits are connected so that if the input signal is entirely removed the oscillator which was oscillating at the instant of the removal of the input signal continues to oscillate.

6. An electronic relay as claimed in claim 4 wherein the first and second latch circuits are connected so that in the absence of an input signal a particular oscillator oscillates.

7. An electronic relay as claimed in claim 6 wherein each latch circuit comprises a bridge rectifier connected across the associated control winding, and first and second transistors, the emitter-collector paths of which are connected across the output of the bridge rectifier, the output of the bridge rectifier being applied to the base of the first transistor of the other latch circuit, the input signal being applied between the bases of the second transistors.

8. An electronic relay as claimed in claim 7 which includes connecting means settable to connect the output of the rectifier bridge of each latch circuit to the base of the second transistor of that latch circuit.

9. An electronic relay as claimed in claim 4 wherein an input low-pass filter is provided at the input of each latch circuit.

10. An electronic relay as claimed in claim 4 wherein an output low-pass filter is provided at the output of each of the first and second electronic relays.

* * * * *

PO-1050
(5/69)

UNITED STATES PATENT OFFICE
CERTIFICATE OF CORRECTION

Patent No. 3,673,435 Dated June 27, 1972

Inventor(s) Brian STANLEY

It is certified that error appears in the above-identified patent and that said Letters Patent are hereby corrected as shown below:

On the title sheet, left column, beneath
"[21] Appl. No.: 20,240" insert
--[73] Assignee: Avimo Limited--.

Signed and sealed this 3rd day of April 1973.

(SEAL)
Attest:

EDWARD M.FLETCHER,JR.
Attesting Officer

ROBERT GOTTSCHALK
Commissioner of Patents

IMW/pb